(No Model.)

W. H. LEWIS.
SHUTTER FOR PHOTOGRAPHIC CAMERAS.

No. 372,857. Patented Nov. 8, 1887.

WITNESSES:
Donn Twitchell
C. Sedgwick

INVENTOR:
W. H. Lewis
BY Munn & Co.
ATTORNEYS.

UNITED STATES PATENT OFFICE.

WILLIAM H. LEWIS, OF BROOKLYN, NEW YORK, ASSIGNOR TO E. & H. T. ANTHONY & COMPANY, OF NEW YORK, N. Y.

SHUTTER FOR PHOTOGRAPHIC CAMERAS.

SPECIFICATION forming part of Letters Patent No. 372,857, dated November 8, 1887.

Application filed March 12, 1887. Serial No. 230,641. (No model.)

*To all whom it may concern:*

Be it known that I, WILLIAM H. LEWIS, of Brooklyn, in the county of Kings and State of New York, have invented new and Improved Shutters for Photographic Cameras, of which the following is a full, clear, and exact description.

This invention consists in certain means, substantially as hereinafter described, and pointed out in the claims, for controlling the movement of shutters of photographic cameras, and is more especially applicable to shutters having a straight sliding movement and to that description of such shutters which are adapted to both instantaneous and time work.

The invention, although here shown applied to a front board or plate of a camera having simply a light aperture through it and designed to be used in connection with a lens-tube in rear of said board, may be otherwise arranged, if desired, according to the description of camera used and the kind of lens-tube, fixed or movable, employed.

Reference is to be had to the accompanying drawings, forming a part of this specification, in which similar letters of reference indicate corresponding parts in all the figures.

Figure 1:
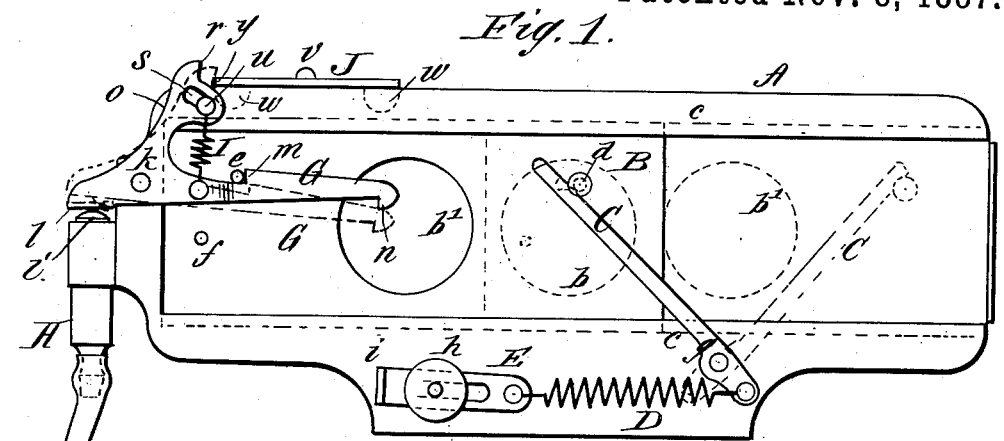
Figure 2:
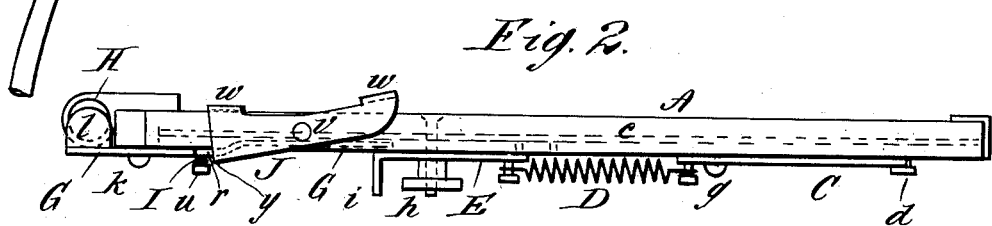
Figure 3:
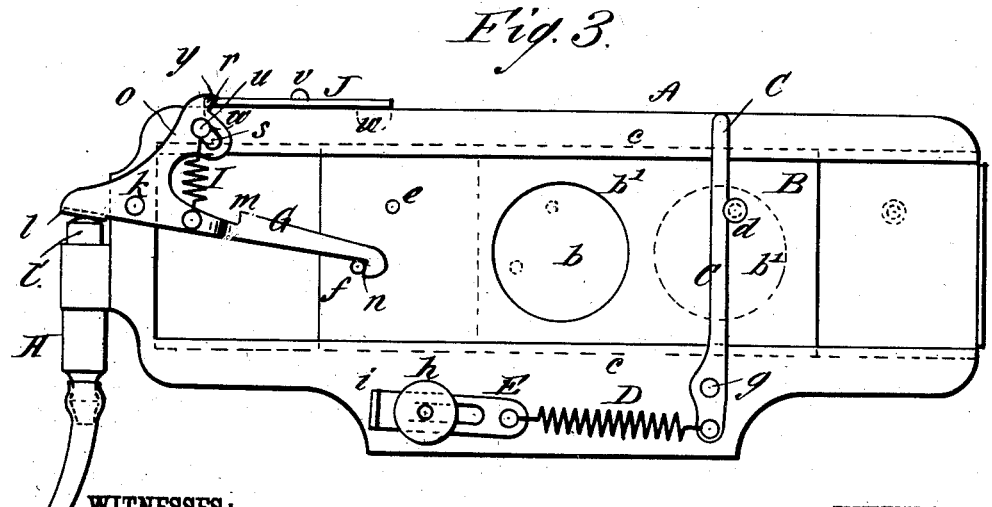

Figure 1 represents a face view of the shutter with its operating mechanism as adjusted for taking an instantaneous picture. Fig. 2 is a longitudinal edge view or plan of the same; and Fig. 3 is a view similar to Fig. 1, with the operating mechanism of the shutter adjusted for taking a time-picture.

A is the board or plate which carries the shutter, and $b$ the light-aperture or lens opening therein.

B is the shutter, which is a straight or longitudinally-sliding one, working in or along grooves or ways $c\ c$ in the facial-raised margins of the board A, and which is provided with an aperture, $b'$, corresponding to the aperture $b$ in the board. Projecting from the one side or face of the shutter are studs or projections $d\ e\ f$, the one $d$ being upon the one side of the shutter-aperture $b'$, and the others, $e\ f$, upon the opposite side thereof. The stud $d$ serves for a lever, C, used to throw the shutter and pivoted, as at $g$, to bear against. This lever C, which is controlled by a spring to throw the shutter, and is consequently a spring one, forms a very convenient and simple means for operating or throwing the straight sliding shutter.

D is a straight spiral metal spring, or it might be a rubber cord or strap for giving to said lever its spring-action. The one end of this spring is attached to the lever C near its fulcrum, so that the lever will have a quick and long movement to throw the shutter, while the spring, which is shown attached to the lever on the outer side of its fulcrum, will have a slower and shorter movement. The other end of the spring D is attached to a slotted bar or slide, E, adjustable by the finger and clamped, when adjusted, by a screw-button, $h$, or other fastening. By shifting this bar in or out, relatively to the lever C, the tension of the spring D may be varied to give a quicker or slower throw to the lever and to take up lost elasticity in the spring. Said bar or slide may be arranged near the outer margin of the board A, so as to make it conveniently accessible, and be provided with a lip, $i$, to provide for its convenient adjustment. Indicating-marks may be made on the board for determining the adjustment of said bar or slide.

G is a lever or lever double-catch, pivoted, as at $k$, to the board A, near its back end, and the outer end of which may project outside said end of the board and be suitably shaped to form a wing or lip, $l$, for tripping the catch either by finger, by a cord, or by a pneumatic releasing device, H. The inner arm or portion of this catch G has notches, hooks, or lips $m\ n$, one in rear of the other and on opposite sides or edges of it, to engage, respectively, with the studs or projections $e\ f$ on the shutter, as will be hereinafter described. Said lever-catch G is also provided with a side arm, $o$, terminating at its outer end, which is shown, to project slightly above the longitudinal margin of the board A, in a hook or lip, $r$, and having a slot, $s$, within which projects a stoppin, $u$, that may serve the double purpose of limiting the movement of the lever-catch G, and of attaching the one end of a spring, I, the other end of which is connected with the forward arm of the lever-catch, operating to lift said arm.

J is a flat lever-stop, pivoted intermediately of its length, as at $v$, on the outer longitudinal marginal portion of the board A and provided at its opposite ends with lips $w$ $w$, that limit the reverse movements of the lever-stop to put its one end, $y$, into or out of lock or stop with the hook or lip $r$ of the lever-catch G, for a purpose that will be hereinafter described.

To take an instantaneous picture, the lever-stop J is adjusted, so that its end $y$ is thrown into locking or stopping position with the hook or lip $r$ of the lever-catch G, as shown in Fig. 2. The shutter B is then forced or drawn back, its stud $f$ passing clear of the hook or lip $n$, and its stud $e$ riding over the inclined back of the lever-catch G and working said catch against the tension of its spring I, to engage with the hook or lip $m$ thereof to hold the shutter, as shown by full lines in Fig. 1, till it is required to release the same. To shoot the shutter by the spring-lever C, the outer back end of lever double-catch G is lifted or moved till its lip or hook $r$ comes in contact with the end $y$ of the lever-stop J, when the stud or pin $e$ will be released from the lip or hook $m$ of the lever-catch, and the spring-lever C will throw the shutter uninterruptedly till its aperture $b'$ passes beyond the aperture $b$ in the board A, all as shown by dotted lines in Fig. 1.

To take a time-picture, the stop-lever J is adjusted in the reverse direction to put its end $y$ out of locking or stopping position with the hook or lip $r$ of the lever-catch G, which will admit of an extended movement of the lever-catch. The shutter B is then forced or drawn back, as before, till the pin or stud $e$ engages with the lip or hook $m$ of the lever-catch to hold the shutter till it is required to release it. Upon releasing the shutter, however, by lifting or moving the outer back end of the lever-catch G to the full extent of its movement, which then is not limited by the stop-lever J, not only is the lip $m$ of the lever-catch disengaged from the pin $e$, so that the spring-lever C is free to throw the shutter, but the hook or lip $n$ of the lever-catch G is thrown into position to engage with the stud or pin $f$ of the shutter to hold the apertured portion $b'$ of the latter in alignment with the lens-aperture $b$ in the board A, as shown by full lines in Fig. 3. After the necessary time-exposure, however, has been made, then pressure is removed from the back outer end of the lever-catch G, when the spring I will operate to lift or disengage the lip or hook $n$ from the pin $f$, and the spring-lever C will further move to throw the shutter forward till its aperture $b'$ passes beyond the aperture $b$ in the board A, as shown by dotted lines in Fig. 3.

This invention is independent of that described in another application for patent made by me, Serial No. 222,789, filed December 28, 1886, in which a rocking arm or lever for throwing the shutter was combined with a button secured to the camera in concentric relation with the pivot of said lever, and provided with a circular series of notches or ratchet-teeth for operation in connection with a spring arranged to engage at its one end with the notched surface of the button and at its other end with the arm or lever; also, in which a double-catch lever, controlled by a spring, was combined with a push-pin, and with an adjustable stop adapted to vary and control the inward stroke or movement of said pin; also with an apertured sliding shutter having studs or pins adapted to independently engage with the catch-lever, subject to control by the push-pin, accordingly as it was required to take an instantaneous or time picture, spring means for throwing the shutter, and a sliding rod engaging with one of the studs on the shutter for moving the latter against the tension of its operating-spring. Such combinations of devices, accordingly, are not claimed in the present application for patent.

The wing or lip $l$ upon the catch-lever G forms an extended surface for the piston or plunger $l'$ of the pneumatic releasing device H to bear against when operating said lever. The pneumatic device H may be of the ordinary kind used in operating camera-shutters, and in which an elastic hand-bulb and a flexible tube, connecting said bulb with the cylinder in which the plunger $l'$ works, are used. Such device is only shown in part in the drawings.

Having thus fully described my invention, I claim as new and desire to secure by Letters Patent—

1. The combination, with the apertured sliding shutter B, of the lever C, adapted to throw said shutter, the spring D, and the adjustable slide E, provided with means for clamping or holding it when adjusted to vary the tension of the spring, essentially as described.

2. The combination, with the apertured sliding shutter B, of the lever C, adapted to throw said shutter, the spring D, with its adjustable slide, the double-catch lever G, adapted to engage at different points with the shutter, the spring I, and the adjustable lever-stop J, substantially as specified.

3. The combination, with the apertured sliding shutter B, having studs or projections $e$ $f$, of the double-catch lever G, having hooks or lips $m$ $n$ $r$, the spring I, a fixed stop for limiting the movement of said lever, and the adjustable lever-stop J, adapted to vary the movement of said catch-lever, essentially as and for the purposes herein set forth.

WILLIAM H. LEWIS.

Witnesses:
 EDGAR TATE,
 EDW. M. CLARK.